US011360271B2

(12) United States Patent
Claes et al.

(10) Patent No.: US 11,360,271 B2
(45) Date of Patent: Jun. 14, 2022

(54) ACTIVE OPTICAL SWITCH SYSTEM WITH ANTI-WETTING COATING

(71) Applicant: COMMSCOPE TECHNOLOGIES LLC, Hickory, NC (US)

(72) Inventors: Roland Simon H. Claes, Dendermonde (BE); Yolanda Justo Zarraquinos, Etterbeek (BE); Sarah Günther-Müller, Ilmenau (DE); Shuhao Si, Ilmenau (DE)

(73) Assignee: COMMSCOPE TECHNOLOGIES LLC, Hickory, NC (US)

( * ) Notice: Subject to any disclaimer, the term of this patent is extended or adjusted under 35 U.S.C. 154(b) by 576 days.

(21) Appl. No.: 16/332,636

(22) PCT Filed: Sep. 12, 2017

(86) PCT No.: PCT/US2017/051174
§ 371 (c)(1),
(2) Date: Mar. 12, 2019

(87) PCT Pub. No.: WO2018/049399
PCT Pub. Date: Mar. 15, 2018

(65) Prior Publication Data
US 2021/0356673 A1   Nov. 18, 2021

Related U.S. Application Data

(60) Provisional application No. 62/393,473, filed on Sep. 12, 2016.

(51) Int. Cl.
*G02B 6/35* (2006.01)
(52) U.S. Cl.
CPC ......... *G02B 6/3538* (2013.01); *G02B 6/3546* (2013.01); *G02B 6/3536* (2013.01)

(58) Field of Classification Search
CPC ............................ G02B 6/3538; G02B 6/3546
See application file for complete search history.

(56) References Cited

U.S. PATENT DOCUMENTS 7,283,696 B2 * 10/2007 Ticknor .............. B01F 13/0076
385/129
8,529,743 B2 *  9/2013 Kim ..................... G02B 26/005
204/450
(Continued)

FOREIGN PATENT DOCUMENTS

JP    2005255923 A  *  9/2005  .............. C08L 83/08
JP    2008-185610 A      8/2008
(Continued)

OTHER PUBLICATIONS

Extended European Search Report for corresponding European Patent Application No. 17849774.9 dated Mar. 30, 2020, 8 pages.
(Continued)

*Primary Examiner* — Daniel Petkovsek
(74) *Attorney, Agent, or Firm* — Merchant & Gould P.C.

(57) ABSTRACT

An optical switch includes a substrate with a waveguide-coupling area and a fluid channel with an anti-wetting layer on a first surface. First and second fluids are on the anti-wetting layer in the fluid channel and at least one fluid is selectively movable relative to the waveguide-fluid coupling area. A fluidic driving mechanism has at least one electrode positioned to apply an electric field to at least one of the fluids in the fluid channel and is capable of moving at least one of the fluids in the fluid channel. The anti-wetting layer has an alkyl silane coating, which includes alkyl silane molecules covalently bonded to the first surface of the fluid channel.

22 Claims, 6 Drawing Sheets

(56) References Cited

U.S. PATENT DOCUMENTS

| | | | |
|---|---|---|---|
| 9,874,701 B2* | 1/2018 | Baets | G02B 6/3568 |
| 2003/0012483 A1 | 1/2003 | Ticknor et al. | |
| 2003/0142901 A1* | 7/2003 | Lahann | B82Y 10/00 |
| | | | 385/18 |
| 2003/0219196 A1* | 11/2003 | Weng | G01N 21/6452 |
| | | | 506/32 |
| 2006/0083473 A1 | 4/2006 | Ticknor et al. | |
| 2013/0301106 A1 | 11/2013 | Chanuk et al. | |
| 2017/0080693 A1* | 3/2017 | Petkov | B05D 1/18 |
| 2021/0199892 A1* | 7/2021 | Lerma Arce | G02B 6/12 |

FOREIGN PATENT DOCUMENTS

| | | |
|---|---|---|
| JP | 2016-109499 A | 6/2016 |
| KR | 10-2013-0125517 A | 11/2013 |
| WO | 2015/092064 A1 | 6/2015 |
| WO | 2016/107769 A1 | 7/2016 |
| WO | 2016/131825 A1 | 8/2016 |

OTHER PUBLICATIONS

Hsieh, J. et al., "Tunable microfluidic optical-fiber devices based on electrowetting pumps and plastic microchannels", IEEE Photonics Technology Letters, 15(1): 81-83 (Jan. 2003).

Lee, J. et al., "Surface-Tension-Driven Microactuation Based on Continuous Electrowetting, Journal of Microelectromechanical Systems", 9(2): 171-180 (Jun. 2000).

Kreit, E. et al., "Laplace Barriers for Electrowetting Thresholding and Virtual Fluid Confinement", Langmuir Article, American Chemical Society, 1-7 (Jul. 2010).

Mugele, F. et al., "Electrowetting: from basics to applications", J. Phys: Condens. Matter 17: R705-R774 (2005).

Quinn, A. et al., "Contact Angle Saturation in Electrowetting", J. Phys. Chem. B., 109: 6268-6275 (Mar. 2005).

Zhou, P. et al., "Numerical Simulation of Electrocapillary Driven Flows", Micro and Nanosystems, 1: 57-62 (2009).

International Search Report and Written Opinion of the International Searching Authority for International Patent Application No. PCT/US2017/051174 dated Dec. 28, 2017, 9 pages.

* cited by examiner

ACTIVE OPTICAL SWITCH SYSTEM WITH ANTI-WETTING COATING

CROSS-REFERENCE TO RELATED APPLICATION

This application is being filed on Sep. 12, 2017 as a PCT International Patent Application and claims the benefit of U.S. Patent Application Ser. No. 62/393,473, filed on Sep. 12, 2016, the disclosure of which is incorporated herein by reference in its entirety.

BACKGROUND OF THE INVENTION

The present invention is generally directed to optical communications, and more specifically to active optical switch systems with anti-wetting coatings.

Optical fiber networks are becoming increasingly prevalent in part because service providers want to deliver high bandwidth communication and data transfer capabilities to customers. As optical networks become more complex, it has become increasingly important to manage optical signals in the network. Many optical signal management functions, such as redirecting signals to bypass faulty components, or opening new channels to facilitate the addition of more users of the network, can be accomplished using active optical switches, such as electro-wetting on dielectric (EWOD)-activated optical switches. Such active optical switches are based on the principles of microfluidics: two fluids with different refractive indices, wherein one fluid typically is a liquid, are moved in an adiabatic waveguide coupler. Depending on the location of the fluids within the waveguide coupler, the coupler switches between two states, either facilitating or prohibiting the transition of a propagating optical signal from one waveguide to another.

In the active optical switches described above, it is necessary to facilitate the movement of fluids within a waveguide coupler. Depending on the characteristics of the fluids and their contacting surfaces, certain Young contact angles form between the fluids and the surface. The higher the contact angle, the easier it is to move the fluid, meaning that less energy is required to operate the switch. If the contact angle is less than 90°, a fluid "wets" the surface, and movement cannot be easily controlled. Thus, it is advantageous to provide an anti-wetting surface to facilitate the movement of fluids in such switches.

The most common hydrophobic, anti-wetting coating is polytetrafluoroethylene (PTFE), also known commercially as Teflon. PTFE has excellent hydrophobic properties, and can be deposited in a number of ways. However, certain characteristics of PTFE make it unsuitable for use in the active optical switches described above. For example, PTFE coatings are relatively thick, typically on the order of a hundred nanometers, and even under sophisticated, high precision deposition, on the order of ten nanometers. Even at ten nanometers, an anti-wetting coating can significantly affect the optical coupling capabilities of EWOD-type optical switches. And in any event, it is difficult to apply a PTFE coating of consistent thickness. Additionally, PTFE bonds only physically, rather than covalently to the surface on which it is deposited, negatively affecting the long-term durability and stability of the coating. Furthermore, PTFE most commonly is deposited via dip- or spin-coating processes, limiting the shapes of substrates than can be effectively coated, and generally limiting full and uniform coating.

It is thus desirable to have an active optical switch employing an anti-wetting coating that is thin so as not to interfere with optical coupling, stable and durable to withstand long-term use in a variety of environmental conditions, and capable of consistent, and substantially full and uniform deposition on substrates of a variety of shapes.

SUMMARY OF THE INVENTION

An embodiment of the invention is directed to an active optical switch system that has a substrate with a waveguide-coupling area, a fluid channel with a first surface adjacent to the substrate and an anti-wetting layer on the first surface, and first and second fluids within the fluid channel. The first and second fluids are on the anti-wetting layer, and at least one of the fluids is selectively moveable with respect to the waveguide-coupling area. A fluidic driving mechanism moves at least one of the fluids within the fluid channel, and has at least one electrode positioned to apply and electric field to at least the one fluid in the fluid channel. The anti-wetting layer includes an alkyl silane coating, which has alkyl silane molecules covalently bonded to the first surface of the fluid channel.

Another embodiment of the invention is directed to a method of making an electro-wetting on dielectric (EWOD)-actuated optical switch that includes providing a substrate that has a fluid-optical coupling area and a proximate waveguide, and providing a fluid channel proximate to the fluid-optical coupling area of the substrate. The fluid channel has a first surface. An alkyl silane with an alkyl group and a silicon atom with at least one active group is reacted with the first surface of the fluid channel to form a covalent bond between the first surface and the alkyl silane, resulting in the formation of an anti-wetting alkyl silane coating on the first surface of the fluid channel.

Another embodiment of the invention is directed to an optical switch with a substrate that has an optical waveguide. The switch also has a fluid channel containing first and second fluids wherein at least one surface of the fluid channel is coated with an anti-wetting layer, and wherein at least one electrode is disposed to apply an electric field across the fluid channel. At least one of the fluids is selectively movable within the fluid channel relative to a waveguide-fluid interaction region. An optical characteristic of the waveguide is dependent on whether the first fluid or second fluid is located at the waveguide-fluid interaction region. The anti-wetting layer includes an alkyl silane coating, which has alkyl silane molecules covalently bonded to the surface of the fluid channel.

Another embodiment of the invention is directed to a fluidic device with a fluid channel containing a first fluid and a second fluid. The first fluid is relatively polar and the second fluid is relatively non-polar. The fluid channel including at least one sidewall coated with a layer of an anti-wetting agent. The device has at least one electrode for applying an electric field to at least one of the fluids in the fluid channel. The layer of anti-wetting agent includes a compound whose molecules have heads covalently bound to the sidewall and dewetting tails protruding into the fluid channel from the sidewall.

The above summary of the present invention is not intended to describe each illustrated embodiment or every implementation of the present invention. The figures and the detailed description which follow more particularly exemplify these embodiments.

BRIEF DESCRIPTION OF THE DRAWINGS

The invention may be more completely understood in consideration of the following detailed description of various embodiments of the invention in connection with the accompanying drawings, in which.

Figure 1:
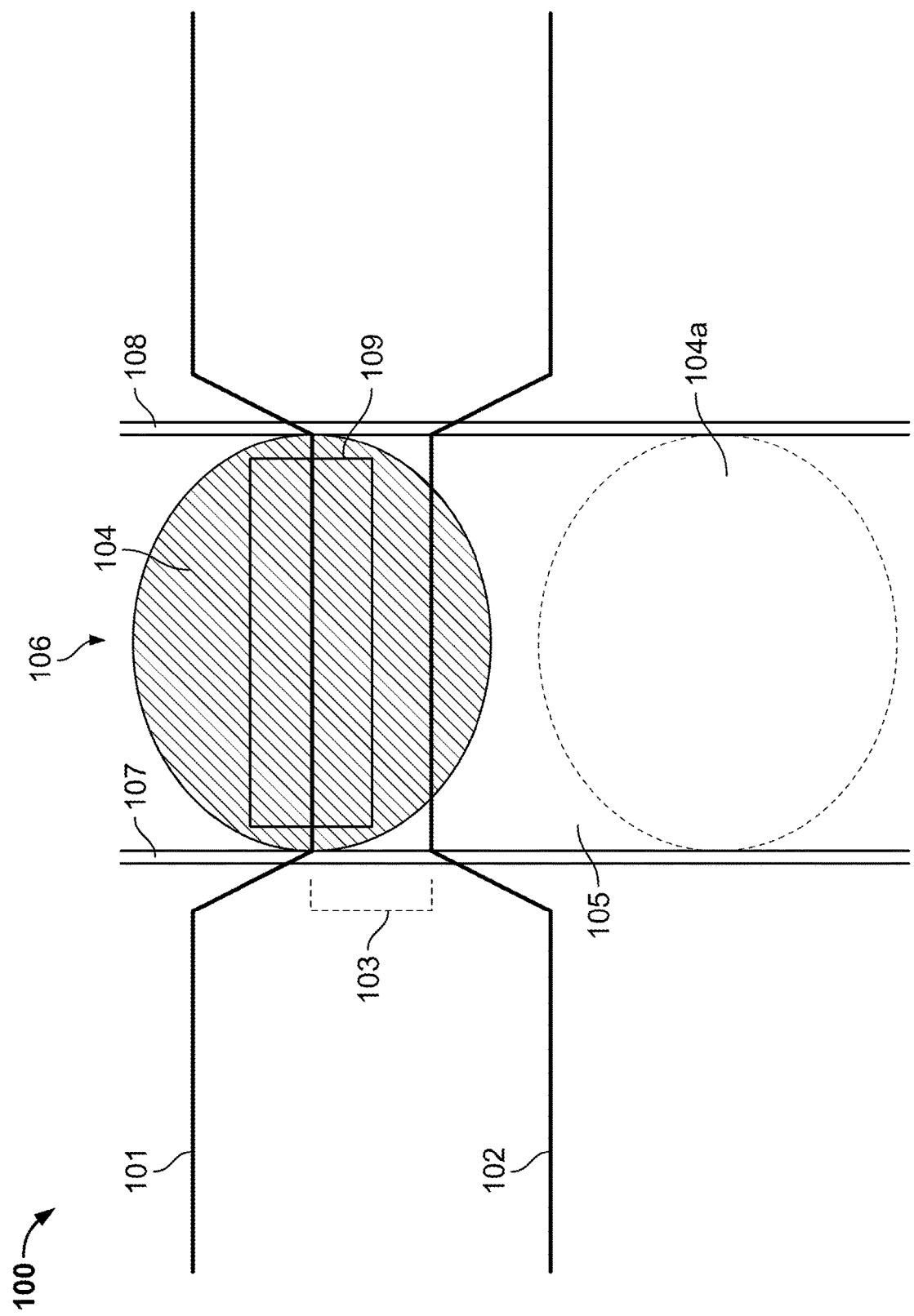
FIG. 1 schematically illustrates an embodiment of an active optical switch system according to an embodiment of the present invention.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention as defined by the appended claims.

DETAILED DESCRIPTION

The present invention is directed to systems, devices, and methods that can provide benefits to optical communication networks. More particularly, the invention is directed to active optical switch systems and devices employing anti-wetting coatings, which are capable of operating over a wide bandwidth. Some active optical switches, such as electro-wetting on dielectric (EWOD)-activated optical switches, may use anti-wetting coatings to aid in the movement of fluids in the switch. The deposition of the most commonly used anti-wetting coating, polytetrafluoroethylene (PTFE), also known as Teflon, results in a relatively thick anti-wetting layer in such switches when known deposition methods are used, on the order of tens to hundreds of nanometers in thickness. The efficacy of active optical switches like EWOD-activated switches, however, are particularly sensitive to the thickness of anti-wetting coatings, with thicker anti-wetting coatings diminishing the effectiveness of the switch. The invention described below addresses this and other problems associated with PTFE and other anti-wetting coatings that have been used in active optical switches, describing a thin and durable anti-wetting coating that permits an effective active optical switch.

An exemplary embodiment of an active optical switch 100 is schematically illustrated in FIG. 1. The active optical switch 100 incorporates a first waveguide 101 and a second waveguide 102. The first and second waveguides 101, 102 are situated physically closer to one another in a waveguide-light coupling region 103, a region where light propagating along one of the waveguides 101, 102 may couple to the other waveguide 102, 101. Whether light couples between the waveguides 101, 102 depends on the effective refractive index experienced by the light as it propagates along the waveguides 101, 102. The effective refractive index can be altered by positioning a fluid of greater or lesser refractive index close to the waveguide-light coupling region 103 and the waveguide-fluid coupling region 109, discussed further below.

In many embodiments, the active optical switch includes two fluids that are moveable to change the state of the switch. The figure shows a first fluid 104 positioned over the waveguide-light coupling region 103 and the waveguide-fluid coupling region 109. A second fluid 105 is shown generally filling the remaining space of the fluid channel 106. The first and second fluids 104, 105 may be in either a liquid or gaseous phase. The first fluid 104 has a first refractive index and the second fluid 105 has a second refractive index, different from the first refractive index. The first and second fluid 104, 105 may move within fluid channel 106, so for example, the first fluid 104 may move away from waveguide-light coupling region 103 and waveguide-fluid coupling region 109 to the location shown as 104a, with the second fluid 105 generally filling the remaining space in the fluid channel 106. One or more of the inner surfaces of the fluid channel 106 may be coated with anti-wetting coatings, such as coatings shown as 107, 108, to assist in controlling the position of first and second fluids 104, 105 with respect to the waveguide-light coupling region 103 and waveguide-fluid coupling region 109.

In the illustrated embodiment, an optical signal transmitted into the first waveguide 101 is coupled to the second waveguide 102 when the first fluid 104 is positioned close to the waveguide-light coupling region 103 and the waveguide-fluid coupling region 109. This is referred to as the switch's "cross state." An optical signal transmitted into the first waveguide 101 is output from the first waveguide 101 when the first fluid 104a is positioned away from the waveguide-light coupling region 103 and the waveguide-fluid coupling region 109, and instead the second fluid 105 is positioned near coupling regions 103, 109. This is referred to as the switch's "bar state." Microfluidic optical switches have previously been described, for example in U.S. Provisional Patent Application No. 62/094,506, "Integrated Optical Switching and Splitting for Optical Networks," filed on Dec. 19, 2014, in U.S. Provisional Patent Application No. 62/116, 784, entitled "Remote Control and Power Supply for Optical Networks," filed on Feb. 16, 2015, and in WO 2015/092064A1, "Adiabatic Coupler," published on Jun. 25, 2015, all of which are incorporated herein by reference.

Figure 2:
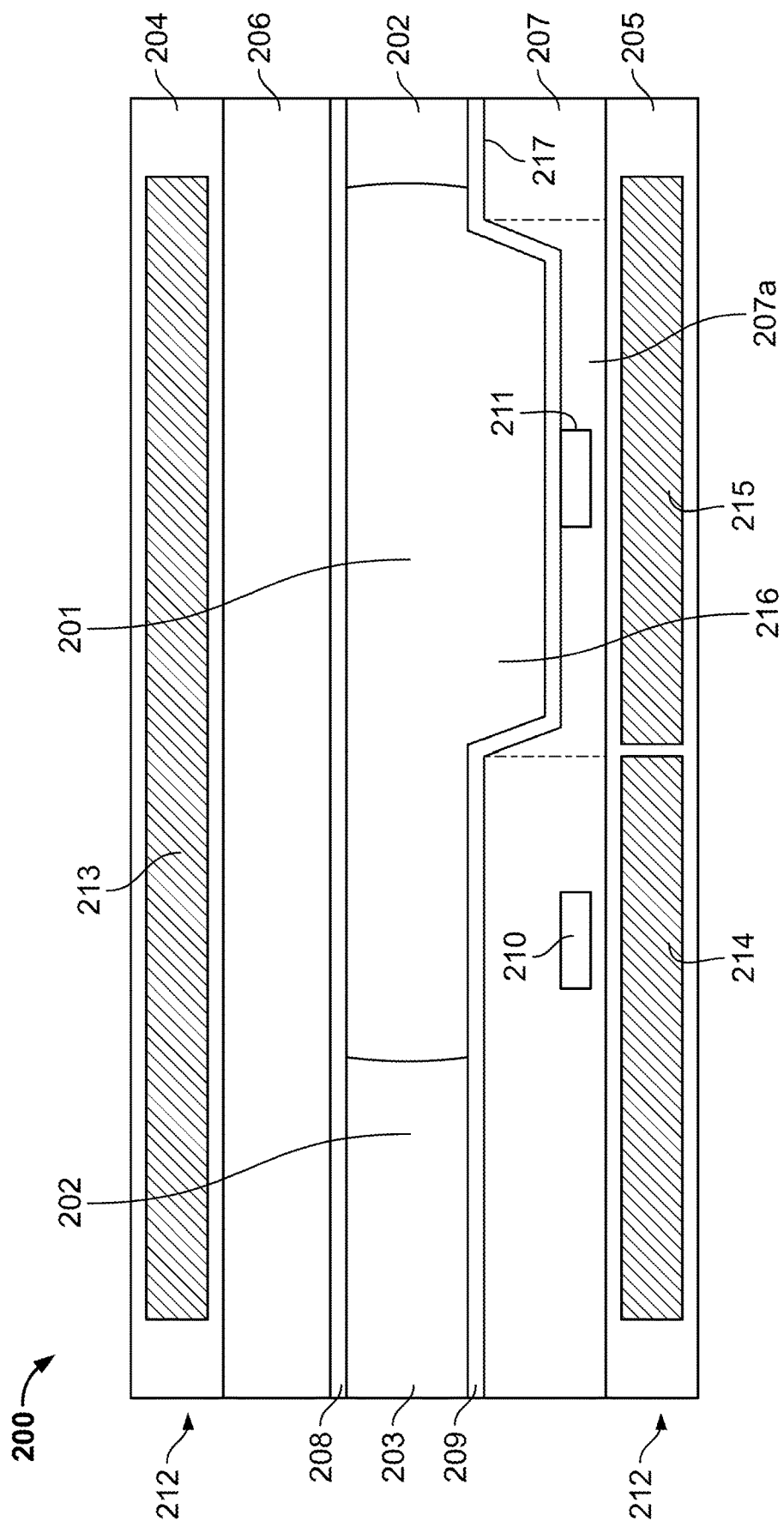
FIG. 2 schematically illustrates a cross-sectional view through a portion of an active optical switch system according to an embodiment of the present invention.

A cross-sectional view through a portion of an exemplary embodiment of an active optical switch system 200 is schematically illustrated in FIG. 2. In this embodiment, optical fluids are moved in a fluid channel relative to waveguides using the technique of electro-wetting. A first fluid 201 and a second fluid 202 are disposed within a fluid channel 203 formed between two structures 204, 205. Either of the first and second fluids 201, 202 may be in a liquid or gaseous phase, though in the illustrated embodiment, at least the first fluid 201 is liquid and, in a preferred embodiment, the second fluid 202 is also a liquid. The first fluid 201 has a first refractive index and the second fluid 202 has a second refractive index, different from the first refractive index. The first structure 204 is provided with a common electrode 213, insulated from channel 203 by a first dielectric layer 206, which provides at least partial electrical insulation between the common electrode 213 and the fluids 201, 202 and the fluid channel 203. A first anti-wetting layer 208 may be deposited on the first dielectric layer or substrate 206 to facilitate movement of fluids 201, 202 in the fluid channel 203. The second structure 205 is provided with multiple electrodes 214, 215 that can be activated with an applied voltage independently of each other. A fluidic driving mechanism, generally 212, comprises the common electrode 213 and the independently addressable electrodes 214, 215. In the illustrated embodiment, two independently addressable electrodes 214, 215 are shown, but it will be appreciated that other embodiments of the invention may include a larger number of independently addressable electrodes. It will further be appreciated that the multiple independently addressable electrodes 214, 215 may be located in the first structure 204, while the common electrode could be located in the second structure 205. It will also be appreciated that, in alternative embodiments, it may not be necessary to insulate each electrode from the fluids in an EWOD-type switch, which may require only one electrode to be insulated from the fluids of the switch. Alternative embodiments also may have independently addressable electrodes and a common electrode located in the same substrate, for example, structure 204. Alternative embodiments may also have only independently addressable electrodes, without a common electrode incorporated into the active optical switch system, wherein the independently addressable electrodes are located, for example, in structure 204. In the illustrated embodiment, a second dielectric layer or substrate 207, having an upper surface 217, at least partially insulates electrodes 214, 215 from the fluids 201, 202 and the fluid channel 203. In the illustrated embodiment, the surface 217 is also the bottom surface of the fluid channel 203. A second anti-wetting layer 209 may be deposited on the second dielectric layer or substrate 207, for example on the shared surface 217, to facilitate movement of fluids 201, 202 in the fluid channel 203.

The second substrate 207 contains a first waveguide 210 and a second waveguide 211. An etched region 216 of the second substrate 207 above the second waveguide 211 exposes the second waveguide 211 at or close to the upper surface 217 of the second substrate 207, on which the second anti-wetting layer 209 may be deposited. The etched region 216 defines a waveguide-fluid coupling region 207a of the second substrate 207, in which the refractive index of the fluid located above the second waveguide 211 can affect the propagation constant of light passing along the second waveguide 211. The first waveguide 210 is located away from the etched region 216 of the second substrate 207 and away from the waveguide-fluid coupling region 207a, remaining isolated within the second substrate 207 so that the refractive index of the fluid above the first waveguide 210 has substantially no impact on the propagation constant for light passing along the first waveguide 210.

In the illustrated embodiment, the first fluid 201 has a relatively higher refractive index than the second fluid 202. The first fluid 201 is located within the fluid channel 203 and in the etched region 216, so that the relatively higher refractive index of the first fluid 201 affects the effective refractive index experienced by light propagating along the second waveguide 211. According to the illustrated embodiment, light can couple between the second and first waveguides 211, 210 when the first fluid 201 is in the etched region 216. In other words, when the first fluid 201 is in the etched region 216, the switch is in the cross state. In another switch state, when the first fluid 201 is outside of the etched region 216, and the second fluid 202 with a relatively lower refractive index is in the etched region 216, the effective refractive index experienced by light propagating along the second waveguide 211 is changed, preventing coupling of light between waveguides 211, 210, and the switch is in the bar state. It will be appreciated that in alternative embodiments, the first fluid may have a lower refractive index than the second fluid, so that the first fluid could induce the switch to assume the cross state when the first fluid is in the etched region. Alternative embodiments may also employ a first fluid of relatively higher refractive index than the second fluid, and which induces a bar state when in the etched region, and vice versa.

The electro-wetting (EW) effect can be described as a change in the contact angle of a liquid due to an applied potential difference. In the illustrated embodiment, when an electric field is generated between, for example, electrodes 213 and 215, the surface tension of liquid 201 lying between the electrodes 213 and 215, can be reduced, allowing it to "wet" the surface it contacts. As in the embodiment illustrated in FIG. 2, because the EW effect is applied to liquid 201 separated from electrodes 213, 214, 215 by dielectric layers 207, 206, this configuration is referred to as electro-wetting on dielectric (EWOD). As discussed above, it will be appreciated that only one electrode need be insulated from the fluids of the switch so as to qualify as an EWOD-type switch.

In the illustrated embodiment, the fluidic driving mechanism 212 selectively applies electric potentials to the electrodes 213, 214, 215 of optical switch 200 to move fluids 201, 202 inside fluid channel 203. For example, in a configuration (not shown) where fluid 201 is above the first waveguide 210, i.e. not in the etched region 216, voltages may be applied to the second electrode 215, together with common electrode 213. Such activation of electrodes 213, 215 may result in fluid 201 moving from a location above the first waveguide 210 to the location shown in FIG. 2, above the second waveguide 211 and in the etched region 216. The movement of fluid 201 causes corresponding movement of fluid 202 inside fluid channel 203. In this way the bar state and cross state of optical switch system 200 can be set.

The use of the EW effect to move liquid droplets is well known, and the use of microfluidics in the control of optical waveguide devices has been described in WO2015/092064A1, "Adiabatic Coupler," filed on Dec. 21, 2014, incorporated herein by reference, in U.S. Provisional Patent Application No. 62/094,506, "Integrated Optical Switching and Splitting for Optical Networks," filed on Dec. 19, 2014, and in U.S. Provisional Patent Application No. 62/116,784, entitled "Remote Control and Power Supply for Optical Networks," filed on Feb. 16, 2015, both of which have been incorporated by reference. But it will be appreciated that other conformations and configurations of electrode and fluid or liquid can be used to move fluids 201, 202. It will further be appreciated that such approaches can be used to move two or more liquids. For example, if a channel contains two immiscible liquids, separated at an inter-liquid interface, movement of one of the liquids via the EW effect can result in both liquids being moved in the channel. The second liquid can be moved along the channel by the EW forces acting on the first liquid, even though the second liquid does not itself exhibit EW behavior. For example, liquids that respond well to EW typically are polar in nature, but the second liquid may be non-polar, yet still be moved as a result of an EW force applied via a polar liquid. The EW technique can also be used to move liquid droplets around a network of microchannels, so long as electrodes are suitably positioned along the different channels.

The movement of fluids in a fluid channel in the active optical switch systems described above may be facilitated by an anti-wetting coating on one or more surfaces of the fluid channel, such as the coatings 107, 108, 208, 209 discussed in reference to FIGS. 1 and 2 above.

The compounds used to produce the anti-wetting coatings discussed herein are generally alkyl silanes, whose silicon atom is activated with a reactive group, such as a halogen or an alkoxy, for example an alkoxy group having 6 or fewer carbon atoms. For the purposes of this disclosure, "alkyl" means an alkyl chain, branched or unbranched, saturated or unsaturated. In some embodiments, the alkyl chain is substituted with hydrophobic groups, for example with fluorine atoms, to increase the anti-wetting properties of the resulting coating. Such substitution can be partial or full. The silicon atom is provided with one to three active groups, such as halogen atoms or alkoxy groups, that react with silol groups on the substrate surface to form a covalent bond with the silane.

Example 1:
1H,1H,2H,2H-perfluorodecyltrichlorosilane

Figure 3:
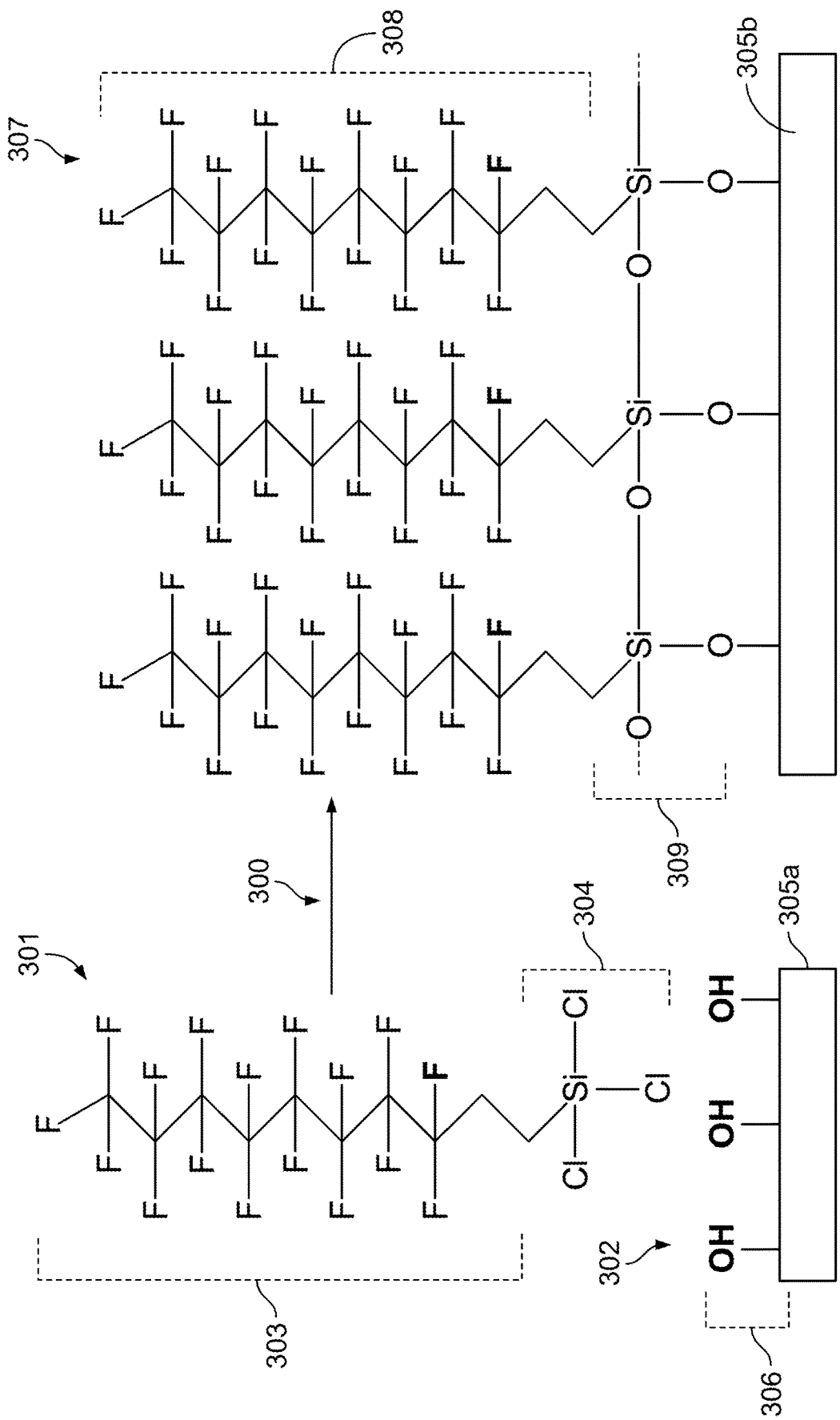
FIG. 3 schematically illustrates the chemistry of an embodiment of an anti-wetting coating as used in an active optical switch system according to an embodiment of the present invention.

According to the present invention, an exemplary embodiment of a molecule that may be used to coat a surface of the fluid channel 301 is illustrated in FIG. 3. Molecule 301 is a fluorinated alkyl chlorosilane, where the fluorinated alkyl group 303 is illustrated as having ten carbon atoms, and the silicon headgroup 304 is illustrated as a trichlorosilane. The illustrated fluorinated alkyl chlorosilane 301 is substantially, but not completely fluorinated and has the chemical name 1H,1H,2H,2H-perfluorodecyltrichlorosilane ("FDTS"), and the chemical formula $C_{10}H_4Cl_3F_{17}Si$. Other compounds, including other fluorinated alkyl chlorosilanes, may be used to provide an anti-wetting layer used in an EWOD optical switching device as further discussed below.

The illustrated chlorosilane molecule 301 covalently bonds to substrate 302. Substrate 302 may be the dielectric layers 206, 207 as discussed in reference to FIG. 2, with the chemical bond occurring, for example, at surface 217. In the illustrated embodiment, the substrate 302 may be a silicon wafer 305a with a hydroxylated silicon surface 306. The surface 306 may be hydroxylated spontaneously by the presence of water in the ambient atmosphere. The chlorosilane headgroup 304 of the molecule 301 reacts with the hydroxylated silicon surface 306 of substrate 302 with the addition of water and under elimination of hydrochloric acid. Water in the reaction may be supplied by trace water molecules in the atmosphere. This reaction produces a hydrophobic, anti-wetting molecule 307, having the silane headgroup 309 covalently bonded to the silicon substrate 305b and covalently cross-linked to adjacent molecules, and the hydrophobic, dewetting alkyl tail 308 directed away from the surface of the substrate 305b. The anti-wetting layer, for example anti-wetting layers 208, 209 discussed in reference to FIG. 2 above, is comprised of a monolayer of molecules 307, covalently cross-linked and bound to the substrate 305b. The illustrated dechlorination reaction that results in bonding the molecules to the substrate converts the fluorinated alkyl chlorosilane to a fluorinated alkyl oxysilane.

The particular example illustrated in FIG. 3 uses 1H,1H, 2H,2H-perfluorodecyltrichlorosilane as the initial reagent, having the chemical formula $C_{10}H_4O_3F_{17}Si$, which produces a layer of 1H,1H,2H,2H-perfluorodecyltrioxysilane bonded to the substrate surface. The resulting monolayer of dewetting material formed on substrate 305b has a thickness on the order of one nanometer. Furthermore, because the molecule 307 is covalently bonded to substrate 305b, the coating produced by molecule 307 is significantly more durable than other hydrophobic, dewetting substances such as PTFE, which do not covalently bond to the surfaces on which it is deposited.

It will be appreciated that the alkyl groups 303, 308 remain substantially unchanged through reaction 300 in the illustrated embodiment. In the illustrated embodiment, molecules 301, 307 contain ten carbon atoms, however other embodiments of the present invention may employ alkyl chains containing fewer or more carbon atoms, preferably four or more carbon atoms, more preferably between about four and sixteen carbons. Still other embodiments may employ molecules without an alkyl chain, as discussed further below.

In the illustrated embodiment, alkyl groups 303, 308 of molecules 301, 307 each have seventeen fluorine atoms bonded to carbon atoms. In different embodiments, the alkyl groups may be completely fluorinated, or may contain fewer fluorine atoms, while still maintaining effective hydrophobic, anti-wetting properties.

In the illustrated embodiment, the silicon headgroup 304 of the free molecule contains three chlorine atoms, which are replaced by oxygen atoms once the molecule is bonded to the silicon substrate 305b. Other embodiments may include a starting reagent having a head group with fewer than three chlorine atoms, or the chlorine atoms may not all be replaced by oxygen atoms in the reaction. The reactivity of an alkyl chlorosilane, like 301, with a silicon substrate, like 302, decreases with decreasing numbers of chlorine atoms in the headgroup. Thus, while some embodiments of the present invention may produce a dewetting mono-layer by reacting a fluorinated alkyl chlorosilane having fewer than three chlorine atoms in the headgroup, higher dewetting properties are produced when a fluorinated alkyl trichlorosilane is used as the starting reagent.

In another embodiment, a fluorinated alkyl chlorosilane, such as 301, may react with a silicon substrate having a surface comprising silicon dioxide to produce a mono-layer of a dewetting, fluorinated alkyl silane, like 307, covalently bonded to the silicon substrate.

One effective approach to apply a dewetting coating to a substrate used in an EWOD-activated optical switch involves reacting a fluorinated alkyl chlorosilane with the surface of a silicon substrate. The surface of the silicon substrate may be hydroxylated silicon or silicon dioxide. The reaction may employ water from the ambient environment and eliminate hydrochloric acid in the process. The reaction produces a fluorinated alkyl oxysilane, covalently bonded to the silicon substrate. As discussed above in reference to FIG. 3, variations, including on the fluorinated alkyl chlorosilane, may be employed in the reaction.

Example 2: Vapor Phase Coating a Silicon Substrate Using
1H,1H,2H,2H-Perfluorodecyltrichlorosilane The reaction may take place over a range of temperatures, but a coating may be efficiently and uniformly applied by heating the silicon substrate and the fluorinated alkyl chlorosilane, for example with a hot plate or heating chamber, to a coating temperature of between 40° C. and 300° C., preferably between 120° C. and 200° C., and even more preferably to a temperature of approximately 165° C. A uniform coating is obtained by allowing the reaction to take place over a heating time period of preferably one to three hours, and even more preferably approximately two hours at approximately 165° C. The coating reaction occurring at the coating temperature over a coating time period allows the fluorinated alkyl chlorosilane to react in the vapor phase, allowing for substantially uniform and complete coating of substrate surfaces of a variety of geometries. Because the coating reaction essentially produces a monolayer of fluorinated alkyl oxysilane, the coating thickness is substantially predictable and consistent.

To test the stability and solubility of hydrophobic coatings produced with a fluorinated alkyl silane, FDTS, was deposited on silicon dioxide surfaces of multiple silicon wafers. The wafers were stored in various solutions, including ethylene glycol and diphenyl sulfide for periods of up to around six months. The stability of the anti-wetting layer was tested by measuring, at different times over the six month period, the contact angle of droplets of various fluids on the FDTS-treated surfaces, using the Laplace-Young method. The contact angle measurements remained within the margin of error of the measurement technique over the six month period, indicating that the anti-wetting layer of the FDTS-treated silicon dioxide was stable and did not degrade. Thus one advantage of the present invention is an anti-wetting coating for use in active optical switches that is stable and insoluble in fluids employed in active optical switches, such as EWOD-activated switches.

Another advantage of the present invention is the durability of the anti-wetting coating for use in active optical switches described herein. Unlike common hydrophobic, dewetting substances that may be contemplated for use in such switches, such as PTFE which can be easily scratched or otherwise physically removed from a surface, the coatings of the present invention, such as that produced by FDTS-treated silicon, covalently bond to the substrate, making the coating much more durable than a PTFE coating, which does not covalently bond to silicon substrates.

Yet another advantage of the present invention is that the anti-wetting coating employed in the active optical switches are very thin, of the order of one nanometer. The ability of a fluid to affect the effective refractive index of light traveling along a waveguide depends on the distance between the fluid and the waveguide. It is thus advantageous for any anti-wetting coating to be as thin as possible while still maintaining hydrophobic, anti-wetting properties. Thus, the anti-wetting coating of the present invention is substantially a monolayer of a fluorinated alkyl silane, of the order of one nanometer thick. This is substantially thinner than can be achieved using conventional hydrophobic materials, such as PTFE. Teflon coatings often are on the order of a hundred nanometers in thickness, and even the thinnest PTFE coatings are not less than ten nanometers thick.

Figure 4:
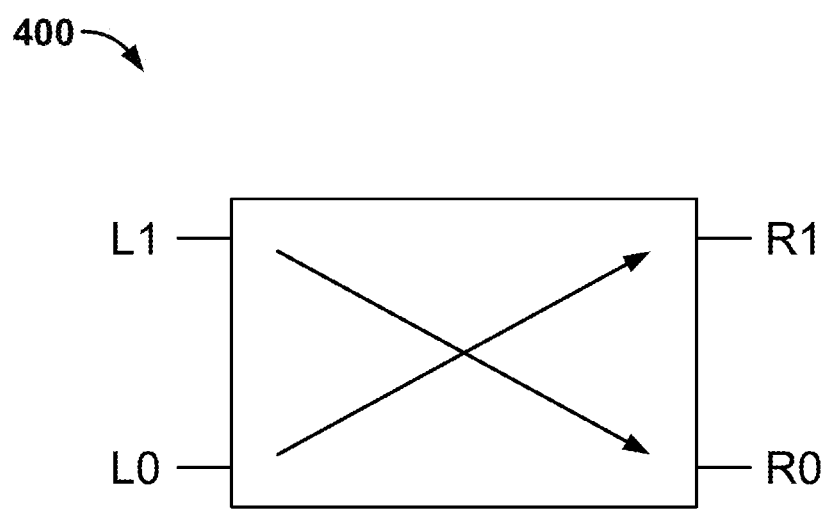
FIG. 4 schematically illustrates an active optical switch in the cross state, according to an embodiment of the present invention.
Figure 5A:
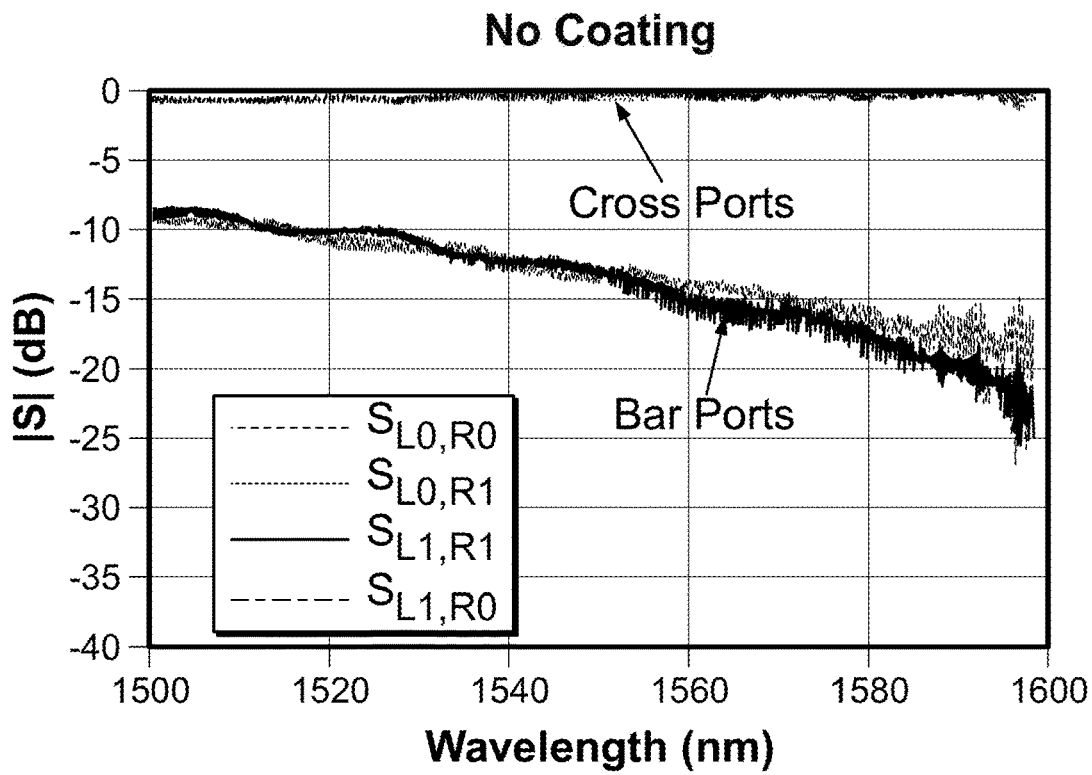
FIGS. 5A-5D presents experimental results of the operation of an optical switch a) without an anti-wetting layer, b) the switch of graph a) with a fluorinated alkyl silane anti-wetting layer, c) another optical switch without an anti-wetting layer, and d) the switch of graph c) with a PTFE anti-wetting layer.
Figure 5B:
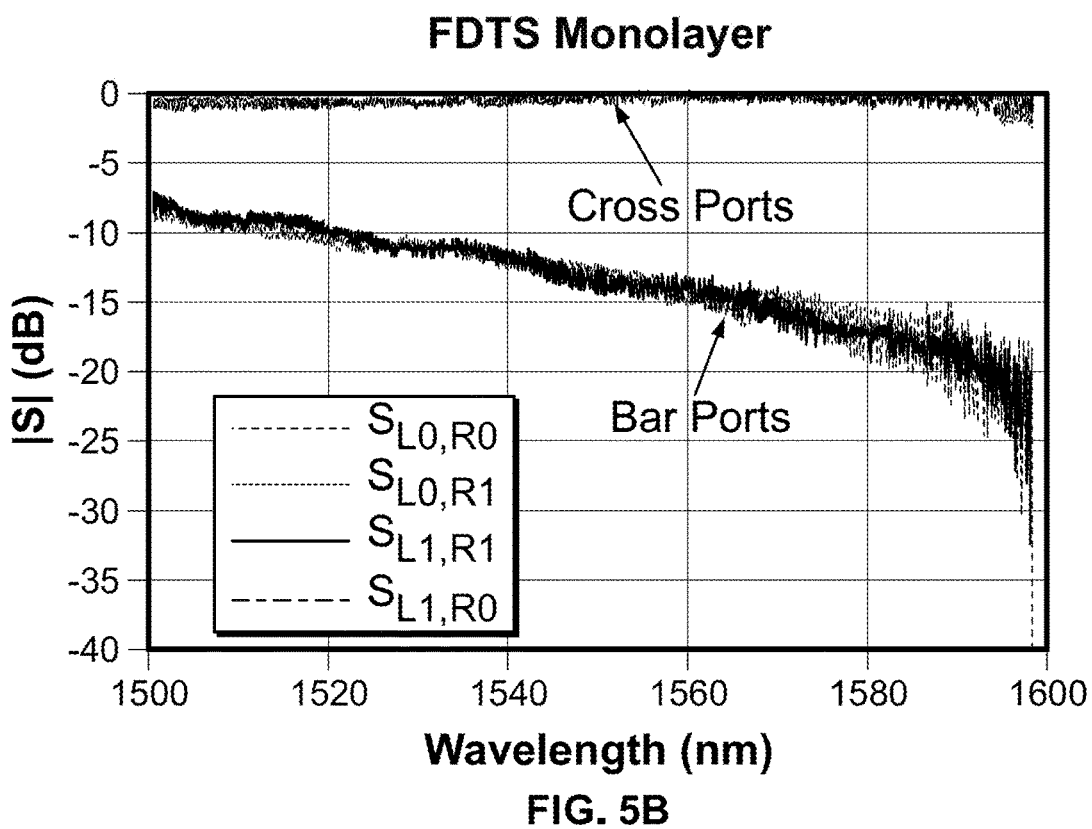
Figure 5C:
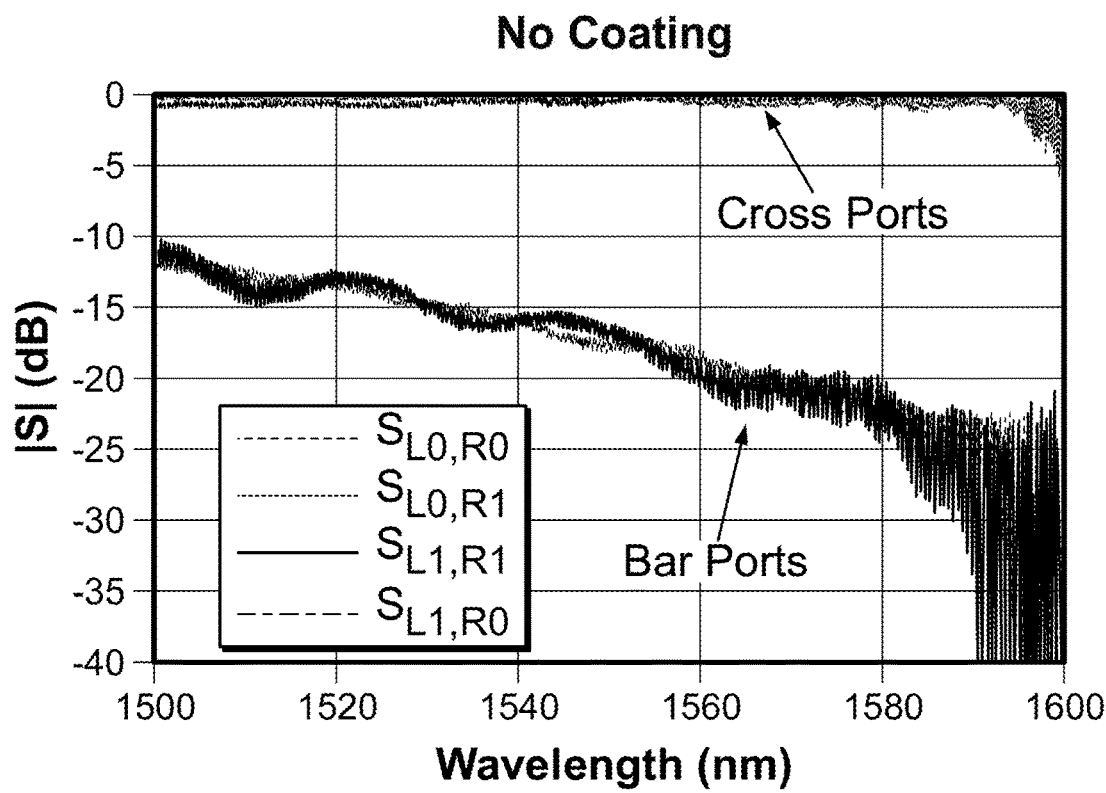
Figure 5D:
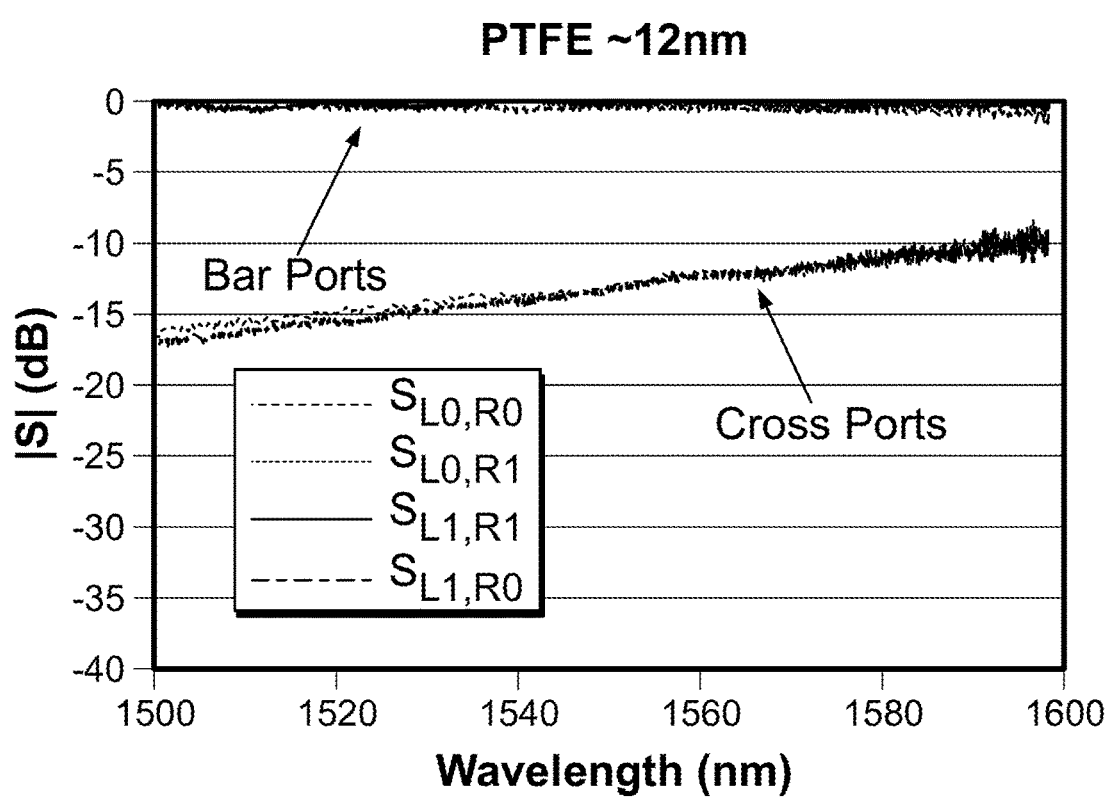

A related advantage of the present invention is that the anti-wetting coating employed in the active optical switches does not negatively affect the ability of light traveling down one waveguide to couple to the second waveguide when the active optical switches described herein are in their cross states. The attenuation experienced by light propagating through an optical switch in its cross state like those described in FIGS. 1 and 2 was measured with 1) no coatings applied to the silicon substrate, 2) a roughly 12 nanometer PTFE coating applied to the silicon substrate, and 3) a monolayer coating of an FDTS-treated silicon substrate. In each configuration, the attenuation of light was measured for the four possible paths light can take in a 2×2 active optical switch 400, shown schematically in FIG. 4: beginning in waveguide 0 (the "L0" position) and traveling through the switch to end in waveguide 0 (the "R0" position); beginning at L0 and traveling through the switch to end in waveguide 1 (the "R1" position); beginning in waveguide 1 (the "L1" position) and traveling through the switch to end in waveguide 1 (the "R1" position); beginning at the L1 position and traveling through the switch to end in the R0 position. The L0-R0 and L1-R1 paths are prohibited when the active optical switch is in its cross state, whereas the L0-R1 and L1-R0 paths are allowed when the active optical switch is in its cross state.

As shown by the measurements presented in FIGS. 5A-5D, when no coatings were applied to the silicon substrates and the switch was in the cross state, graph a), light of the L0-R0 path (red) and L1-R1 path (blue) was significantly attenuated, whereas light of the L0-R1 path (yellow) and L1-R0 path (green) experienced almost no attenuation. These same results held true for the optical switch with a monolayer coating of an FDTS-treated silicon substrate, graph b). However, the results were inverted for a switch with a PTFE-coated silicon substrate. The uncoated switch used in this experiment produced the results shown in graph c). When coated with PTFE, however, light of the L0-R0 path and L1-R1 path experienced almost no attenuation, whereas light of the L0-R1 path and L1-R0 path experienced significant attenuation, graph d).

The results corresponding to the PTFE-coated substrate indicate that the use of PTFE as an anti-wetting coating in such active optical switches substantially degrades the optical performance of the switch in its cross state. The optical switch with a monolayer coating of an FDTS-treated silicon substrate, however, demonstrated attenuation profiles in the cross state similar to switches with no coating. Thus, unlike PTFE, a monolayer coating of an FDTS-treated silicon substrate does not interfere with the function of an active optical switch in its cross state, while still providing other beneficial properties, such as facilitating movement of the fluids in the switch.

Example 3: Other Alkylsilanes

In addition to the approach described above, another effective approach to apply a dewetting coating to a substrate used in an EWOD-activated optical switch involves reacting either halo-, such as chloro-, or alkoxysilanes in the liquid phase with a substrate, such as a glass or a silicon substrate. Liquid phase reactions are preferred for slower-reacting species, such as alkoxysilanes. Thus, while chlorosilanes, and other halosilanes may take part in a vapor reaction, such as that described above, additional halosilanes and alkoxysilanes are available when the reagent is in the liquid phase.

The table below shows test results of some of the liquid reagent silanes that have been deposited on glass, and measurements of the contact angle with water after deposition.

| Name | Molecule | CAS # | Contact Angle H₂O |
|---|---|---|---|
| Trimethoxyhexadecylsilane | | 16415-12-6 | 85 |
| Trimethoxy(octadecyl)silane | | 306942-9 | 100 |
| Tego Phobe 6600 | | 2943-75-1 | 108 |
| (1H,1H,2H,2H-PERFLUOROHEXYL)TRIMETHOXYSILANE | | 85877-79-8 | 95 |
| (1H,1H,2H,2H-PERFLUOROBUTYL)ETHYLTRIETHOXYSILANE | | 102390-98-7 | 95 |
| (1H, 1H,2H,2H-PERFLUOROBUTYL)TRIMETHOXYSILANE | | 85857-16-5 | 93 |
| (1H, 1H,2H,2H-PERFLUORDECTYL)TRIETHOXYSILANE | | 51851-37-7 | 95 |
| (1H, 1H,2H,2H-PERFLUORODECYL)TRIETHOXYSILANE | | 101947-164 | 95 |
| (1H, 1H,2H,2H-PERFLUORODECYL)TRIMETHOXYSILANE | | 83048-65-1 | 110 |

-continued

| Name | Molecule | CAS # | Contact Angle H₂O |
|---|---|---|---|
| (1H, 1H,2H,2H PERFLUORODECYL) DIMETHYL-CHLOROSILANE | 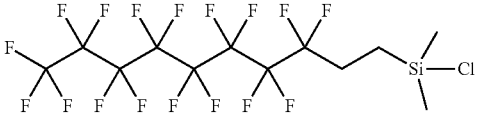 [SMILES: C[Si](C)(Cl)CCC(F)(F)C(F)(F)C(F)(F)C(F)(F)C(F)(F)C(F)(F)C(F)(F)C(F)(F)F] | 74612-30-9 | 113 |
| (1H, 1H,2H,2H PERFLUORODECYL) TRICHLOROSILANE | 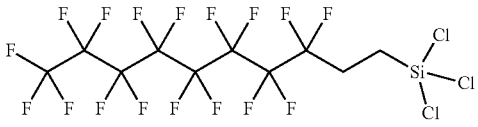 [SMILES: FC(F)(F)C(F)(F)C(F)(F)C(F)(F)C(F)(F)C(F)(F)C(F)(F)C(F)(F)CC[Si](Cl)(Cl)Cl] | 78560-44-8 | 115 |
| 1-(TRICHLOROSILYL) NONAFLUORO-FLUOROHEXANE | 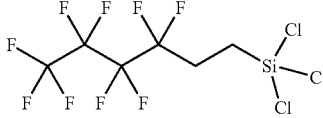 | 7856047-1 | 111 |
| 1-(DIMETHYL-CHLOROSILYL) NONAFLUORO-FLUOROHEXANE | 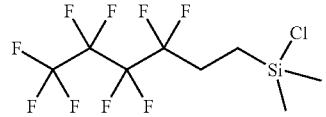 | 119386-82-2 | 95 |
| (1H,1H,2H,2H-PERFLUOROOCTYL) TRICHLORO-SILANE | 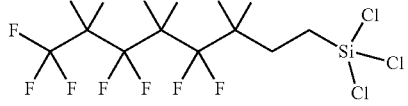 | 7856045-9 | 116 |
| (1H,1H,2H,2H-PERFLUOROOCTYL) DIMETHYL-CHLOROSILANE | 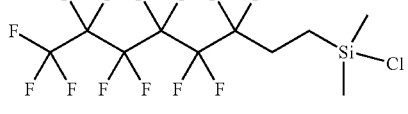 | 10248847-1 | 103 |
| Dimethyldichlorosilane | 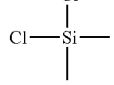 | 75-78-5 | 102 |
| Chlorotrimethylsilane |  | 75-77-4 | 93 |
| Chloro-dimethyl-dodecylsilane | 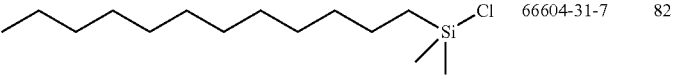 | 66604-31-7 | 82 |

In testing, each of the reagent silanes shown in the chart above formed a covalent bond with the glass substrate and produced a dewetting layer on the surface of the glass substrate. In each case, the deposition process followed cleaning the glass substrate in a solution of HCl, rinsing the substrate with deionized water, and drying. The surface of the glass substrate was then hydroxylated by immersing the substrate in a mixture of aqueous $H_2SO_4$ and $H_2O_2$, rinsing with deionized water and subsequently methanol, and then drying.

Example 4: Liquid Phase Deposition of Non-Chlorinated Silane Layer on Silica (Glass)

A solution was made of approximately 95% ethanol and 5% water, adjusted to a pH of approximately 4.5-5.5 with acetic acid. A roughly 2% concentration of the non-chlorinated silane was then added to the ethanol mixture to promote hydrolysis and silanol formation to occur on the non-chlorinated silane. The non-chlorinated silanes shown in the chart above, and applied to the present invention, all have at least one active group, halo- or alkoxy-bonded to the silicon atom. With the surface of the glass substrate and the non-chlorinated silane hydroxylated, the glass substrate was dipped in the silane solution for approximately 1-2 minutes, allowing the non-chlorinated silanes to react with the hydroxylated surface of the glass substrate. The glass substrate was then rinsed with ethanol, and dried, for example for 5-10 minutes at 110° C. or for approximately 24 hours at room temperature. It will be appreciated that the process of chemically bonding the non-chlorinated silanes to the glass substrate described herein is merely exemplary, and other methods and process of coating a glass substrate with non-chlorinated silanes (containing at least one functional group) so as to form a dewetting layer thereon will be readily apparent.

Example 5: Liquid Phase Deposition of Chlorinated Silane Layer on Silica (Glass)

The deposition of the chlorinated silanes listed in the chart above was accomplished by beginning with a toluene solution and adding an approximately 2% mixture of the chlorinated silane thereto. The solution was allowed to sit for approximately 5 minutes so as to promote hydrolysis and silanol formation on the chlorinated silane. With the surface of the glass substrate and the chlorinated silane hydroxylated, the glass substrate was dipped in the silane solution for approximately 1-2 minutes, allowing chlorinated silanes to react with the hydroxylated surface of the glass substrate. The glass substrate was then rinsed with toluene and then distillate water, and dried, for example for 5-10 minutes at 11 C or for approximately 24 hours at room temperature. It will be appreciated that the process of chemically bonding the chlorinated silanes to the glass substrate described herein is merely exemplary, and other methods and process of coating a glass substrate with chlorinated silanes so as to form a dewetting layer thereon will be readily apparent.

Example 6: Liquid Phase Deposition of Chlorinated Silane Layer on Silicon

The table below shows test results of liquid reagent silanes deposited on a silicon substrate, and measurements of the contact angle with water after deposition.

| Name | Molecule | CAS # | Contact Angle $H_2O$ |
|---|---|---|---|
| (1H,1H,2H,2H PERFLUORODECYL) DIMETHYL CHLOROSILANE | | 74612-30-9 | 97 |
| Chloro-dimethyl-dodecylsilane | | 66604-31-7 | 83 |
| Dimethyldichlorosilane | | 75-78-5 | 102 |

Each of the reagent silanes shown in the chart above formed a covalent bond with the silicon substrate and produced a dewetting monolayer on the surface of the silicon substrate.

The deposition of the chlorinated silanes shown in the chart above was accomplished by adding an approximately 2% mixture of the chlorinated silane to toluene. The resulting solution was allowed to sit for approximately 5 minutes so as to promote hydrolysis and silanol formation on the chlorinated silane. With the surface of the silicon substrate hydroxylated in the same manner as described above for silica, the silicon substrate was dipped in the silane solution for approximately 1-2 minutes, allowing chlorinated silanes to react with the hydroxylated surface of the silicon substrate. The silicon substrate was then rinsed with toluene and then distilled water, and dried, for example for 5-10 minutes at 110° C. or for approximately 24 hours at room temperature. It will be appreciated that the process of chemically bonding the chlorinated silanes to the silicon substrate described herein is merely exemplary, and other methods and process of coating a silicon substrate with chlorinated silanes so as to form a dewetting layer thereon will be readily apparent.

For each of chemicals shown in the charts above, which were deposited on a glass and/or silicon substrate, the contact angle with water was measured, and found to be greater than 90° in all but two examples, which indicates that the resulting layer has Dewetting properties. Regarding the two chemicals that were measured to have contact angles less than 90° (Trimethoxyhexadecylsilane and Chloro-dimethyl-dodecylsilane), each of these measurements are within the margin of error of being 90° for the measurement technique.

Another advantage of the present invention is the durability of these anti-wetting coating applied in the liquid phase. Unlike common hydrophobic, dewetting substances that may be contemplated for use in such switches, such as PTFE which can be easily scratched or otherwise physically removed from a surface, the coatings of the present invention, such as those produced by the liquid silanes shown in the charts above, covalently bond to the substrate, making the coating much more durable than a PTFE coating, which does not covalently bond to glass or silicon substrates. Like the layer of FDTS-treated silicon discussed above, the dewetting layers produced from liquid silanes like those shown in the charts above are very thin, of the order of one nanometer or less. This is substantially thinner than can be achieved using conventional hydrophobic materials, such as PTFE, and advantageous for the reasons stated above.

Various modifications, equivalent processes, as well as numerous structures to which the present invention may be applicable will be readily apparent to those of skill in the art to which the present invention is directed upon review of the present specification. The claims are intended to cover such modifications and devices.

As noted above, the present invention is applicable to optical communication and data transmission systems, including active optical switch systems. Accordingly, the present invention should not be considered limited to the

What we claim as the invention is:

1. An active optical switch system, comprising:
    a substrate having a waveguide-fluid coupling region;
    a fluid channel adjacent the substrate, the fluid channel having a first surface, the first surface being a silicon surface;
    an anti-wetting layer on the first surface of the fluid channel;
    at least a first fluid within the fluid channel and contacting the anti-wetting layer, the first fluid being a first liquid;
    wherein the anti-wetting layer comprises an alkyl silane coating, the alkyl silane coating comprising alkyl silane molecules covalently bonded to the first surface of the fluid channel.

2. The system of claim 1, further comprising a second fluid in the fluid channel, and a fluidic driving mechanism for moving at least one of the first and second fluids within the fluid channel, the fluidic driving mechanism comprising at least one electrode positioned to apply an electric field to at least the first fluid in the fluid channel.

3. The system of claim 1, wherein the alkyl silane molecules comprise unbranched alkyl groups.

4. The system of claim 1, wherein the alkyl silane molecules comprise alkyl groups that are at least partially fluorinated.

5. The system of claim 1, wherein the alkyl silane molecules comprise alkyl groups having between one and eighteen carbon atoms.

6. A method of making an optical switch, comprising:
    providing a substrate with a fluid-optical coupling area and a waveguide proximate the fluid-optical coupling area;
    providing a fluid channel proximate the fluid-optical coupling area and the substrate, the fluid channel having a first surface, the first surface being a silicon surface;
    providing an alkyl silane, the alkyl silane having an alkyl group and a silicon atom with at least one active group;
    reacting the alkyl silane with the first surface to covalently bond the alkyl silane to the first surface, thereby forming an alkyl silane anti-wetting coating on the first surface.

7. The method of claim 6, wherein the alkyl silane anti-wetting coating is substantially a mono-layer of alkyl silane on the first surface.

8. The method of claim 6, wherein the at least one active group comprises at least one of a halogen atom and an alkoxy group.

9. The method of claim 6, wherein the alkyl group is unbranched.

10. The method of claim 6, wherein the alkyl group is at least partially fluorinated.

11. The method of claim 6, wherein the alkyl group comprises between one and eighteen carbon atoms.

12. The method of claim 6, wherein, before reacting the alkyl silane with the first surface, the first surface comprises hydroxylated silicon.

13. The method of claim 6, wherein reacting the alkyl silane comprises reacting the alkyl silane in a vapor phase with the first surface.

14. The method of claim 6, wherein the alkyl silane is a fluorinated alkyl chlorosilane.

15. The method of claim 6, wherein the alkyl silane is a fluorinated alkyl trichlorosilane.

16. The method of claim 15, wherein the fluorinated alkyl chlorosilane is 1H,1H,2H,2H-perfluorodecyltrichlorosilane.

17. The method of claim 6, wherein reacting the alkyl silane with the first surface comprises heating the first surface and the alkyl silane to a coating temperature between 40 and 300° C.

18. The method of claim 17, wherein reacting the alkyl silane with the first surface further comprises maintaining the first surface and the alkyl silane at the coating temperature for between one to three hours.

19. The method of claim 6, wherein reacting the alkyl silane with the first surface comprises reacting the alkyl silane in a liquid phase.

20. The method of claim 6, wherein the alkyl silane comprises an alkoxy active group, and wherein reacting the alkyl silane with the first surface further comprises:
    hydroxylating the alkyl silane in a first hydroxylating solution;
    exposing the first surface to the hydroxylated alkyl silane;
    rinsing the first surface; and
    drying the first surface.

21. The method of claim 6, wherein the alkyl silane comprises a chloro active group, and wherein reacting the alkyl silane with the first surface further comprises:
    hydroxylating the alkyl silane in a first hydroxylating solution;
    hydroxylating the alkyl silane;
    exposing the first surface to the hydroxylated alkyl silane;
    rinsing the first surface; and
    drying the first surface.

22. An optical switch comprising:
    a substrate having at least a first optical waveguide;
    a fluid channel adjacent the substrate, the fluid channel containing a first fluid and a second fluid, at least one surface of the fluid channel being a silicon surface coated with an anti-wetting layer; and
    wherein at least one of the first and second fluids are selectively movable within the fluid channel relative to a waveguide-fluid interaction region, an optical characteristic of the first waveguide being dependent on whether the first fluid or second fluid is located at the waveguide-fluid interaction region; and
    wherein the anti-wetting layer comprises an alkyl silane coating, the alkyl silane coating comprising alkyl silane molecules covalently bonded to the at least one surface.

* * * * *